United States Patent [19]

Peer

[11] Patent Number: 4,992,806

[45] Date of Patent: Feb. 12, 1991

[54] METHOD OF JETTING PHASE CHANGE INK

[75] Inventor: Thomas R. Peer, Londonderry, N.H.

[73] Assignee: Dataproducts Corporation, Woodland Hills, Calif.

[21] Appl. No.: 131,318

[22] Filed: Dec. 8, 1987

Related U.S. Application Data

[63] Continuation of Ser. No. 830,345, Jan. 17, 1986, abandoned.

[51] Int. Cl.[5] .............................................. G01D 15/16

[52] U.S. Cl. .................................. 346/140 R; 346/1.1

[58] Field of Search ............. 346/140 PD, 76 PH, 1.1

[56] References Cited

U.S. PATENT DOCUMENTS

| | | | |
|---|---|---|---|
| 3,596,285 | 11/1984 | Gottwald | 346/75 |
| 4,320,406 | 3/1982 | Heinzl | 346/140 PD |
| 4,427,985 | 1/1984 | Kikuchi | 346/76 PH |
| 4,459,601 | 7/1984 | Howkins | 346/140 PD |
| 4,490,731 | 12/1984 | Vaught | 346/140 PD |
| 4,533,928 | 8/1985 | Sugiuro | 346/140 PD |
| 4,666,757 | 5/1987 | Helinski | 346/135.1 |
| 4,741,930 | 5/1988 | Howard et al. | 346/1.1 |

FOREIGN PATENT DOCUMENTS

| | | |
|---|---|---|
| 0097823 | 1/1984 | European Pat. Off. . |
| 0187352 | 7/1986 | European Pat. Off. . |
| 54368 | 4/1980 | Japan . |
| 113462 | 9/1981 | Japan . |
| 113472 | 9/1981 | Japan . |
| 116162 | 7/1983 | Japan . |
| 58-208062 | 12/1983 | Japan . |
| 60-90775 | 5/1985 | Japan . |
| 2152877 | 8/1985 | United Kingdom . |

OTHER PUBLICATIONS

Oct. 20, 1987 Deposition of Leonard Nash, pp. 138-146, with related Exhibits 33-36.

Pira Ink Jet Printing Report.

Ink Jet Facsimile Recorder, Knoth et al. IEEE Transaction vol. 1A-14, No. 2 Mar./Apr. 1978 pp. 156-161.

Technology of Asynchronous Ink Jet Printing, Koeblitz Society of Photographic Scientists and Engineers, Second Int. Conference pp. 179-181.

Color Hard Copy for Computer Systems, Jaffe et al., Proceedings of the SID, vol. 24/3 1983, pp. 219-234.

*Primary Examiner*—Mark J. Reinhart

*Attorney, Agent, or Firm*—Spensley Horn Jubas & Lubitz

[57] ABSTRACT

A method of operating a system for jetting phase change ink comprises effecting a solid to liquid phase transition of the ink by elevating its temperature, ejecting a first volume of liquid ink towards a target, lowering the temperature of the ejected ink to cause it to solidify after contact with the target and the contacting the first volume of ink with a second volume of similarly jetted ink in a liquid state so that the two volumes are superimposed. Thereafter, the second volume of ink is caused to undergo a liquid to solid transition by lowering its temperature.

27 Claims, 2 Drawing Sheets

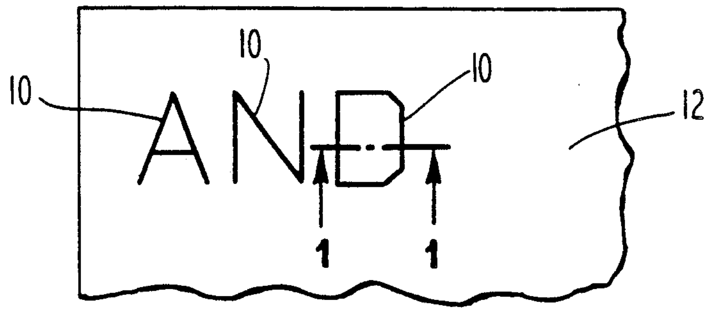
Fig. 6
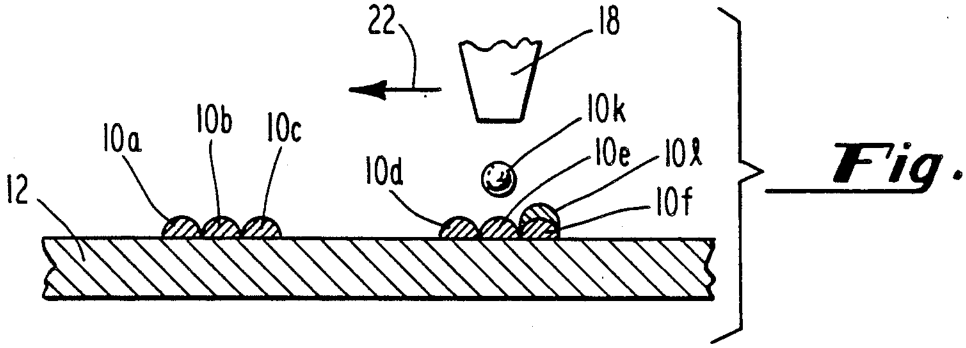
Fig. 5a
Fig. 7
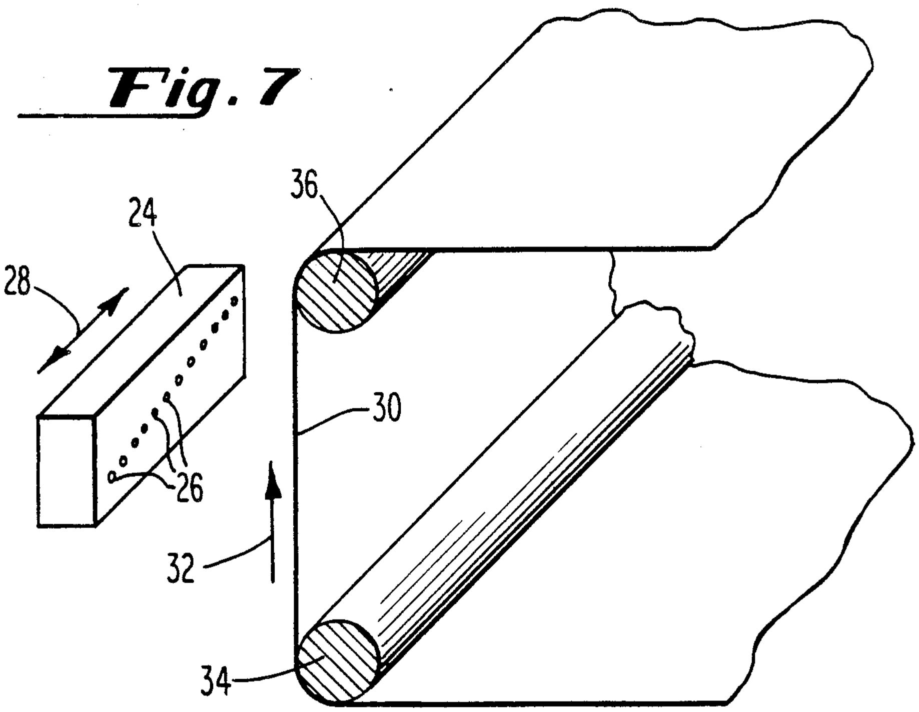

METHOD OF JETTING PHASE CHANGE INK

This is a continuation of copending application Ser. No. 06/830,345 filed on Jan. 17, 1986 now abandoned.

BACKGROUND OF THE INVENTION

This invention relates to the jetting of ink and, more particularly, the jetting of phase change ink.

The use of phase change ink is particularly desirable since it produces high quality print with a high degree of resolution, i.e., good edge definition and contrast.

U.S. Pat. No. 4,390,369, assigned to the assignee of this invention, discloses a hot-melt or phase change ink. The ink is elevated in temperature as it leaves the jet so as to be in the liquid state. On or shortly after contact with the target, the ink solidifies or freezes on the target. Typically, the dot of ink formed by a droplet of phase change ink protrudes from the target such that the dot may be readily discerned by touch with very little spreading of the dot on the surface of the target. Moreover, because of the substantially instant freezing of the droplet on the target, actual penetration of the droplet into the target, which may comprise paper, is minimized, at least as compared with other ink jet inks which are not of the phase change type.

SUMMARY OF THE INVENTION

It is a primary object of this invention to provide a method for ink jetting droplets such that one droplet may be applied on top of another droplet while still obtaining good resolution.

It is a related object of this invention to provide a method for ink jet printing which achieves embossed printing.

In accordance with these and other objects of the invention, phase change ink capable of undergoing a thermally-reversible liquid-to-solid transition is jetted in the following manner. The temperature of the ink is elevated so as to effect a solid-to-liquid phase transition and a first volume of ink is ejected in the liquid state toward a target.

After contacting the target with the first volume, the temperature of the ink is lowered so as to effect a liquid-to-solid phase transition. A second volume of ink is then ejected in the liquid state toward the target. The second volume of ink contacts the first volume of ink such that the second volume is at least partially superimposed on the first volume. The temperature of the second volume of ink is lowered so as to effect a liquid-to-solid phase transition after contact with the first volume.

In accordance with this invention, the area of the target covered by the first volume remains substantially constant before and after being contacted by the second volume. Preferably, the second volume of ink is in substantial registration with the first volume of ink.

In a particularly preferred embodiment of the invention, a scanning motion is created between the ink jetting means and the target. One series of underlying volumes of ink in the liquid state are then ejected toward the target and contact the target in a series of mutually displaced target positions. The temperature of the ink in the underlying volumes is then lowered after contact with the target. Another series of overlying volumes of ink in the liquid state are then ejected toward a target. The overlying volumes of ink respectively contact the underlying volumes of ink in the mutually displaced target positions and the temperature of the overlying volumes of ink is lowered so as to effect a liquid-to-solid transition.

Preferably, the volumes of ink are jetted or ejected from a plurality of ink jets. In this manner, embossed alpha-numeric characters may be printed with a high degree of efficiency.

BRIEF DESCRIPTION OF THE DRAWINGS

FIG. 6 is a planned view of the target with alpha-numeric characters where a cross-sectional view of FIG. 1 is taken along line 1—1 of FIG. 1;

FIG. 5*a* discloses a step comparable to the step depicted in FIG. 5 wherein the scanning motion of the ink jet relative to the target is reversed relative to that shown in FIG. 5; and FIG. 7 is a perspective view of an ink jet matrix juxtaposed to a moving target which may be employed in depositing phase change ink in accordance with the principles of this invention.

DETAILED DESCRIPTION OF PREFERRED EMBODIMENTS

Figure 1:
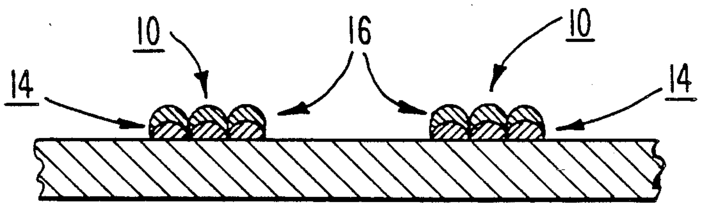
FIG. 1 discloses a target or substrate carrying layers or superimposed volumes or droplets of phase change ink in cross-section.

Referring to FIG. 1, the droplets or individual volume of phase change ink have been deposited on target 12. Phase change ink, sometimes referred to as hot-melt ink, may be of the type disclosed in U.S. No. Pat. 4,390,369. Target 12 may comprise paper or a non-fibrous material such as, for example, plastic.

As shown in FIG. 1, an underlying layer 14 of droplets or volumes of ink is applied to the target 12. An overlying layer 16 of droplets or volumes is applied over the underlying layer 14. By utilizing this superposition of droplets or volumes on top of other droplets or volumes, a raised effect is achieved on the target which can create an embossed alpha-numeric printing of characters as shown in FIG. 6. The application of the volumes of ink 10 to the target 12 as shown in FIGS. 1 and 6 will now be described with reference to FIGS. 2 through 5.

Figure 2:
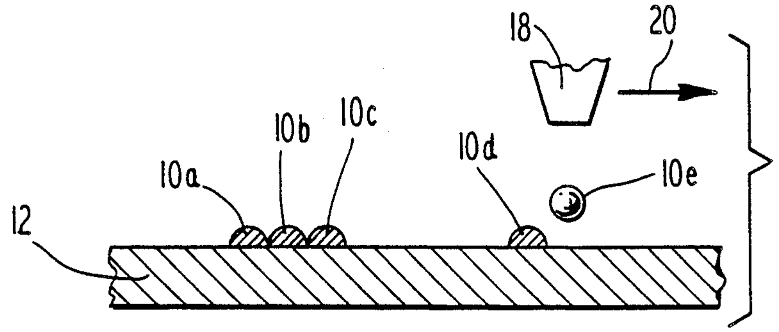
FIGS. 2 through 5 disclose cross-sectional views of different steps in the method of depositing the overlying or superimposed droplets of phase change ink on the target to achieve the results shown in FIG. 1.

As shown in FIG. 2, an ink jet 18 is juxtaposed to the target 12 where the jet 18 is capable of a scanning motion relative to the target as depicted by the arrow 20. In FIG. 2, a series of underlying ink volumes, partially forming the layer 14, are in the process of being applied to the target 12. As shown, volumes 10*a*, 10*b*, 10*c* and 10*d* have been deposited on the target 12 and the temperature of the droplets, which was sufficiently elevated upon ejection so that the ink was int he liquid state, has been lowered so as to undergo a liquid-to-solid phase change. In FIG. 2, the cross-hatching is utilized to indicate this liquid-to-solid phase change. As is also shown in FIG. 2, a droplet or volume 10*e*, which is in the liquid state, is traveling toward the target 12.

Figure 3:
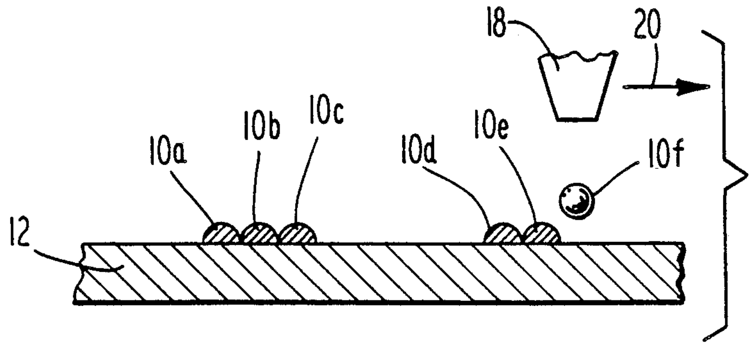

In FIG. 3, the ink jet 18 has advanced to the next position. The droplet or volume 10*e* has solidified, i.e., undergone a liquid-to-solid phase transition. Yet another liquid droplet or volume 10*f* is approaching the target 12.

Figure 4:
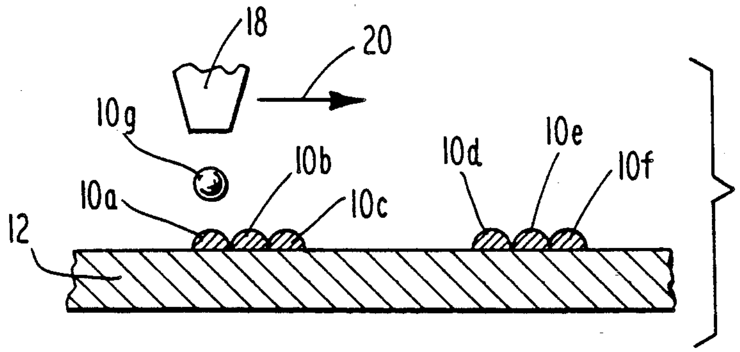

In FIG. 4, all of the droplets 10*a* through 10*f* of the underlying layer 14 have undergone a liquid-to-solid phase change on the target 12. The ink jet 18 has been returned to a position such that a liquid droplet 10*g* is being projected toward the target position covered by the solidified droplet 10*a*.

Figure 5:
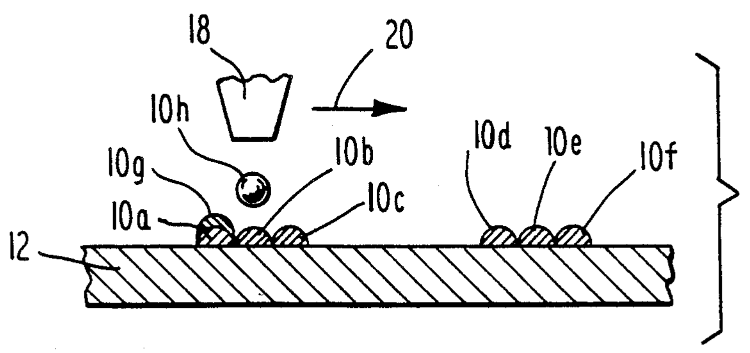

In FIG. 5, the droplet 10*g* has contacted the droplet 10*a* and solidified so as to form part of the overlying series or layer of droplets. Another liquid droplet 10*h* is being projected to the position on the target 12 covered by the volume 10*b*. As the scanning indicated by the arrow 20 of FIG. 5 continues, the overlying series or layer 16 shown in FIG. 1 is completed. This process is continued until the entire alpha-numeric characters forming the word "AND" shown in FIG. 6 is achieved.

As shown in FIG. 1, the volumes or droplets of ink in the overlying series or layer 16 are in substantial registration with the volumes or droplets of ink forming the underlying series or layer 14. However, this need not be the case. As is also shown in FIG. 1, the volumes or droplets 10 are depicted as separate and distinct. In actuality, the droplets or volumes will merge. However, due to the nature of the phase change ink, a high degree of resolution is achieved, i.e., there is little or no spreading of the ink volumes 10 on the target 12 in either the underlying series or layer 14 or the overlying series or layer 16.

It will be appreciated that the steps shown in FIGS. 2 through 5 may be continued so as to apply at least one additional layer of ink volumes to achieve an even further embossed effect.

In the embodiment shown in FIGS. 2 through 5, the scanning motion of the ink jet 18 relative to the target 12 is always in the same direction. As shown in FIG. 5*a*, the overlying volumes of ink are being applied with a scanning motion depicted by the arrow 22 which is in the opposite direction. More specifically, and as shown in FIG. 5*a*. the droplet 10*i* overlying the droplet 10*f* is applied as the jet 18 moves in the direction depicted by the arrow 22. Although this raises the possibility that the volume of ink 10 will be applied shortly after the application the underlying volume of ink 10, the liquid-to-solid phase transition occurs sufficiently rapidly so as not to present a problem.

It will of course be appreciated that, in the interest of efficient and rapid printing, a plurality of ink jets of the type previously described may be employed. More specifically, an ink jet matrix may be utilized as depicted if FIG. 7 so as to project a series of underlying volumes from the matrix and then projecting a series of overlying volumes in mutually displaced target positions. As shown there, an ink jet head 24 comprises a series of orifices 26, each of which is associated with an individual ink jet. The head 24 is scanned in both directions depicted by the arrow 28 relative to moving paper 30 depicted by arrow 32. As shown, the paper 30 is advanced by a suitable transport system depicted by rollers 34 and 36. The head 24 may be of the type disclosed in U.S. Pat. No. 4,459,601, which is assigned to the assignee of this invention and incorporated herein by reference.

Details for a particularly suitable phase change ink are shown in U.S. Pat. No. 4,390,369, incorporated herein by reference.

Although a particular embodiment of the invention has been shown and described and various modifications suggested, other modifications and embodiments will occur to those of ordinary skill in the art which will fall within the true spirit and scope of the invention as set forth in the appended claims.

I claim:

1. A method of operating a system for jetting ink capable of undergoing a thermally-reversible liquid-to-solid phase transition, the method comprising the following steps:

elevating the temperature of the ink so as to effect a solid-to-liquid phase transition;

ejecting a first volume of ink in the liquid state toward a target;

contacting the target with said first volume;

lowering the temperature of said first volume of ink so as to effect a liquid-to-solid phase transition after contact with said target;

ejecting a second volume of ink in the liquid state toward the target;

contacting said first volume of ink with said second volume of ink such that said second volume of ink lies substantially within the outline of said first volume of ink; and lowering the temperature of the ink of said second volume so as to effect a liquid-to-solid transition after contact with said first volume.

2. The method of claim 1 wherein said second volume of ink is in substantial registration with said first volume of ink.

3. A method of printing with an ink jet means by jetting an ink capable of undergoing a thermally-reversible liquid-to-solid phase transition, the method comprising the following steps:

creating a relative scanning motion between said ink jet means and said target;

elevating the temperature of the ink so as to effect a solid-to-liquid phase transition;

ejecting one series of underlying volumes of ink in the liquid state toward a target;

contacting the target with said underlying volumes of ink in a series of mutually displaced target positions;

lowering the temperature of the ink so as to effect a liquid-to-solid phase transition after contact of said underlying volumes with said target;

ejecting another series of overlying volumes of ink in the liquid state toward a target;

contacting the target with said underlying volumes of ink in a series of mutually displace target positions;

lowering the temperature of the ink so as to effect a liquid-to-solid phase transition after contact of said underlying volumes with said target;

ejecting another series of overlying volumes of ink in the liquid state toward a target;

contacting said underlying volumes with said overlying volumes of ink such that each overlying volume lies substantially within a respective underlying volume.

lowering the temperature of the ink so as to effect a liquid-to-solid transition after contact of said overlying volumes with said underlying volumes.

4. The method of claim 3 wherein said underlying volumes of said one series and said overlying series of said other series are in substantial registration.

5. The method of claim 3 wherein said series of volumes form alpha-numeric characters.

6. The method of claim 3 wherein said series of volumes are ejected from a plurality of ink jets in said ink jet means.

7. A printing method, comprising the steps of:

jetting a first volume of liquefied hot melt ink toward a target;

contacting the target with the first volume of ink;

at least partially solidifying the first volume of ink such that the first volume of ink can receive a second volume of ink on the exposed surface of said first volume of ink;

jetting a second volume of liquefied hot melt ink toward the target; and contacting the at least partially solidified first volume of ink with the second volume of ink such that the second volume of ink lies substantially within the outline of the first volume of ink.

8. The method of claim 7, wherein the second volume of ink is in substantial registration on the target with the first volume of ink.

9. The method of claim 7, further comprising the steps of:

at least partially solidifying the second volume of ink such that the second volume of ink can receive a third volume of liquified hot melt ink on the exposed surface of said second volume of ink;

jetting the third volume of liquefied hot melt ink toward the target;

contacting the at least partially solidified second volume of ink with the third volume of ink such that the third volume of ink is at least partially superimposed on the at least partially solidified second volume of ink.

10. The method of claim 7, wherein the first volume of ink is the same color as the second volume of ink.

11. The method of claim 9, wherein the first, second and third volumes of ink are the same color.

12. The method of claim 7, wherein the first volume of ink is completely solidified prior to contact by the second volume of ink.

13. The method of claim 9, wherein the first volume of ink is completely solidified prior to contact by the second volume of ink and the second volume of ink is completely solidified prior to contact by the third volume of ink.

14. A printing method, comprising the steps of:

jetting a first volume of liquefied hot melt ink toward a target;

contacting the target with the first volume of ink; jetting a second volume of liquefied hot melt ink toward the target; and contacting the first volume of ink with the second volume of ink such that the second volume of ink lies substantially within the outline of the first volume of ink.

15. The method of claim 14, further comprising the steps of:

jetting a third volume of liquefied hot melt ink toward the target; and contacting the second volume of ink with the third volume of ink such that the third volume of ink is at least partially superimposed on the second volume of ink.

16. A printer, comprising:

a platen for supporting a printing medium; and printhead means for jetting multiple drops of liquified hot melt ink toward selected locations on the printing medium supported by the platen, such that, for each location, a first drop contacts the medium and partially solidifies and then a second drop contacts the first drop and at least partially solidifies while lying substantially within the outline of the first drop.

17. The printer of claim 16, wherein the printhead means jets the drops such that, for each location, the drops come to rest in substantial registration.

18. The printer of claim 16, wherein the printhead means is operative for jetting the drops at intervals timed so that, for each location, and before contact by a superimposed drop, the underlying drop will at least partially solidify, such that the underlying drop can receive the superimposed drop on the temporarily exposed surface thereof.

19. The printer of claim 16, wherein the printhead means is operative for jetting the drops at intervals timed such that the underlying drops will completely solidify before contact by at least one superimposed drop.

20. The method of claim 7, wherein the target is opaque.

21. The method of claim 20, wherein the target is paper.

22. The method of claim 9, wherein the target is opaque.

23. The method of claim 22, wherein the target is paper.

24. The method of claim 7, wherein the target is plastic.

25. The method of claim 9, wherein the target is plastic.

26. The printer of claim 16, wherein the printhead means is adapted for jetting one drop of hot melt ink on top of another drop of the same color hot melt ink.

27. The printer of claim 16, wherein the printhead means is adapted for jetting multiple drops of a single color hot melt ink superimposed on top of each other.

* * * * *

UNITED STATES PATENT AND TRADEMARK OFFICE

CERTIFICATE OF CORRECTION

PATENT NO. : 4,992,806
DATED : February 12, 1991
INVENTOR(S) : Thomas R. Peer

It is certified that error appears in the above-identified patent and that said Letters Patent are hereby corrected as shown below:

Column 2, line 55, cancel "int he" and insert therefor -- in the --.

In the claims:

Column 4, lines 43-49, cancel "contacting the target ... a target;".

Column 4, line 53, cancel the "." and insert therefor a -- ; --.

Signed and Sealed this

Sixth Day of April, 1993

*Attest:*

STEPHEN G. KUNIN

*Attesting Officer*

*Acting Commissioner of Patents and Trademarks*